(12) United States Patent
Park et al.

(10) Patent No.: US 12,111,234 B2
(45) Date of Patent: Oct. 8, 2024

(54) DEVICE AND METHOD OF DETECTING DEFECTIVE ELECTRONIC COMPONENT

(71) Applicants: SAMSUNG ELECTRO-MECHANICS CO., LTD., Suwon-si (KR); UIF (University Industry Foundation), Yonsei University, Seoul (KR)

(72) Inventors: Heung Kil Park, Suwon-si (KR); Seong Hoon Kim, Suwon-si (KR); Won Suk Ohm, Seoul (KR); Seong Hun Im, Uijeongbu-si (KR)

(73) Assignees: SAMSUNG ELECTRO-MECHANICS CO., LTD., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 5 days.

(21) Appl. No.: 17/886,636

(22) Filed: Aug. 12, 2022

(65) Prior Publication Data

US 2023/0053343 A1    Feb. 23, 2023

(30) Foreign Application Priority Data

Aug. 19, 2021    (KR) .................. 10-2021-0109579

(51) Int. Cl.
*G01M 7/02*    (2006.01)
*G01N 29/12*    (2006.01)
(Continued)

(52) U.S. Cl.
CPC ............ *G01M 7/025* (2013.01); *G01N 29/12* (2013.01); *G01N 29/2431* (2013.01);
(Continued)

(58) Field of Classification Search
CPC .. G01M 7/00; G01M 7/025; G01N 2291/014; G01N 2291/0289; G01N 29/048;
(Continued)

(56) References Cited

U.S. PATENT DOCUMENTS

| 4,008,602 A | * | 2/1977 | Love | ...................... G01N 29/11 73/620 |
| 5,684,252 A | * | 11/1997 | Kessler | .................. G01N 29/26 73/620 |

(Continued)

FOREIGN PATENT DOCUMENTS

| DE | 102011009915 A1 * | 8/2012 | ........... G01N 29/043 |
| EP | 0180277 A1 * | 5/1986 | ............. G01R 27/26 |

(Continued)

OTHER PUBLICATIONS

Su et al, Accelerated Vibration Reliability Testing of Electronic Assemblies Using Sine Dwell with Resonance Tracking, IEEE, 2014 Electronic Components & Technology Conference (Year: 2014).*

(Continued)

*Primary Examiner* — David L Singer
(74) *Attorney, Agent, or Firm* — MORGAN, LEWIS & BOCKIUS LLP

(57) ABSTRACT

A device and method use a heat source to generate heat energy and transfer the generated thermal energy to a plurality of electronic components in a non-contact manner through air to cause the plurality of electronic components to vibrate simultaneously. The device and method use a mechanical resonance detector to detect vibration resonances of the plurality of electronic components simultaneously. The device and method use a post-processing processor to compare the detected vibration resonances of the plurality of electronic components with a reference vibration resonance of a normal product to simultaneously determine (Continued)

whether the plurality of electronic components have defective electronic components.

10 Claims, 6 Drawing Sheets

(51) Int. Cl.
    *G01N 29/24*     (2006.01)
    *G01N 29/44*     (2006.01)

(52) U.S. Cl.
    CPC ..... *G01N 29/4427* (2013.01); *G01N 29/4445* (2013.01); *G01N 2291/014* (2013.01); *G01N 2291/0289* (2013.01); *G01N 2291/2697* (2013.01)

(58) Field of Classification Search
    CPC .. G01N 29/069; G01N 29/12; G01N 29/2431; G01N 29/44; G01N 29/4427; G01N 29/4445; G01R 9/04
    See application file for complete search history.

(56) References Cited

U.S. PATENT DOCUMENTS

| | | | | |
|---|---|---|---|---|
| 6,357,136 | B1* | 3/2002 | Erickson | F26B 5/14 |
| | | | | 73/620 |
| 6,747,268 | B1* | 6/2004 | Ume | G01N 29/46 |
| | | | | 73/628 |
| 7,822,561 | B2* | 10/2010 | Lee | G01R 31/3004 |
| | | | | 365/201 |
| 2004/0200284 | A1* | 10/2004 | Kessier | G01N 29/28 |
| | | | | 73/644 |
| 2005/0225754 | A1* | 10/2005 | Ume | G01N 21/95684 |
| | | | | 356/237.1 |
| 2007/0022815 | A1* | 2/2007 | Kim | G01N 29/223 |
| | | | | 73/628 |
| 2018/0209943 | A1* | 7/2018 | Safai | G01N 29/24 |
| 2019/0212306 | A1* | 7/2019 | Jauriqui | G01N 29/4418 |
| 2019/0279824 | A1* | 9/2019 | Sim | H01G 4/012 |
| 2020/0057030 | A1* | 2/2020 | Hartwig | G01N 29/043 |
| 2021/0356435 | A1* | 11/2021 | Pantea | G01N 29/4481 |
| 2023/0062821 | A1* | 3/2023 | Yoshida | G01N 29/4454 |
| 2023/0135790 | A1* | 5/2023 | Fukuyama | B22F 10/50 |
| | | | | 73/579 |

FOREIGN PATENT DOCUMENTS

| | | | | |
|---|---|---|---|---|
| JP | 7174802 | A | 7/1995 | |
| JP | 3055374 | B2 * | 6/2000 | H01G 4/12 |
| JP | 2008171949 | A | 7/2008 | |
| JP | 5721985 | B2 | 5/2015 | |
| KR | 20140098636 | A * | 8/2014 | G01N 29/04 |
| KR | 1020200017066 | A | 2/2020 | |
| KR | 20210082789 | A * | 7/2021 | G01N 21/95 |

OTHER PUBLICATIONS

Matkowski et al, Vibration tests utilization in the study of reliability of connections in microelectronics, IEEE, 2005 International Students and Young Scientists Workshop Photonics and Microsystems (Year: 2005).*
Thukral et al, Considerations on a Smart Strategy for Simultaneously Testing Multiple PCB Assemblies in Board Level Vibration, 2020 IEEE 70th Electronic Components and Technology Conference (ECTC) (Year: 2020).*
Yang et al., Harmonic vibration test for accelerated reliability assessment of board level packaging, IEEE, 2013 (Year: 2013).*
Levikari et al, Acoustic Phenomena in Damaged Ceramic Capacitors, IEEE Transactions on Industrial Electronics, vol. 65, No. 1, Jan. 2018 (Year: 2018).*
Jae-Yeal Kim et al., Laser-Ultrasonics Application for Non-Contact and Non-destructive Evaluation of Structure, Transactions of the Korean Society of Machine Tool Engineers, Aug. 2005, vol. 14, Issue 4, Republic of Korea.

* cited by examiner

DEVICE AND METHOD OF DETECTING DEFECTIVE ELECTRONIC COMPONENT

CROSS-REFERENCE TO RELATED APPLICATION(S)

This application claims benefit of priority to Korean Patent Application No. 10-2021-0109579 filed on Aug. 19, 2021 in the Korean Intellectual Property Office, the disclosure of which is incorporated herein by reference in its entirety.

TECHNICAL FIELD

The present disclosure relates to a device and method for detecting one or more defective electronic components among a plurality of electronic components.

BACKGROUND

A main material of a multilayer ceramic capacitor (MLCC) having excellent electrical performance has high brittleness, such that various types of defects, such as cracking and delamination, inevitably occur in a process of manufacturing the MLCC.

MLCCs having such defects have very poor electrical performance and are thus classified as defective products, and when such defective products are applied to electronic devices, such defective products may cause unstable operations and malfunctioning of electronic devices.

Accordingly, in order to solve such a problem, a device and method for detecting a defect of an MLCC having high speed and high reliability are essentially required.

In the related art, an MLCC ultrasonic inspection device has been introduced in order to overcome a limitation of an electrical performance inspection.

However, a relatively expensive high-frequency transducer needs to be used in order to detect various types of defects, which may be disadvantageous in terms of economical efficiency.

In addition, the inspection may be performed only in water, and thus, there may be a restriction in terms of a defect measurement environment.

In addition, there are many limitations such as low accuracy in detecting a defect of a specific MLCC design.

Further, in the related art, in order to detect an internal crack in an electronic component such as the MLCC, a method of measuring resonance characteristics by disposing an electrode in a predetermined position on a material having an electrostrictive effect and then applying a voltage to the electronic component has been used.

However, such a method may be disadvantageous in terms of convenience because the electrode (conducting part) needs to be disposed only in a specific position on the material where the electrostrictive effect occurs.

In addition, there may be a problem in which the defective product is not detected because electrical performance of the electronic component is not affected by the defect when a size of the defect is small.

In addition, there may be a problem in which electrical performance of the electronic component is deteriorated because the size of the defect increases due to a piezoelectric effect, a temperature rise, external stress caused by vibrations, or the like when such a defective product is not detected.

SUMMARY

An aspect of the present disclosure may provide a device and method for detecting a defective electronic component capable of solving low economical efficiency and inconvenience that an inspection needs to be performed in water, in a case of using an ultrasonic wave at the time of detecting the defect of the electronic component.

An aspect of the present disclosure may also provide a device and method for detecting a defective electronic component capable of solving inconvenience that a conducting part needs to be formed in a specific position in which an electrostrictive effect occurs, in a case of applying a voltage at the time of detecting the defective electronic component.

An aspect of the present disclosure may also provide a device and method for detecting a defective electronic component capable of solving a problem in which a defective product is not detected because electrical performance of the electronic component is not affected by the defect when a size of the defect is small.

An aspect of the present disclosure may also provide a device and method for detecting a defective electronic component capable of solving a problem in which electrical performance of the electronic component is deteriorated because a size of the defect increases due to a piezoelectric effect, a temperature rise, external stress caused by vibrations, or the like, when a defective product is not detected, depending on a property of the electronic component or a property of the defect.

According to an aspect of the present disclosure, a device for detecting whether a plurality of electronic components having one or more defective electronic components may include: an energy source generating energy and transferring the generated energy to the plurality of electronic components in a non-contact manner to cause the plurality of electronic components to vibrate; a mechanical resonance detector detecting vibration resonances of the plurality of electronic components; and a post-processing processor comparing the detected vibration resonances of the plurality of electronic components with a reference vibration resonance of a normal product to determine whether the plurality of electronic components have one or more defective electronic components and then extracting determined information.

According to an aspect of the present disclosure, a method of detecting whether a plurality of electronic components having one or more defective electronic components may include: an energy transfer operation of transferring energy generated by an energy source to the plurality of electronic components in a non-contact manner to cause the plurality of electronic components to vibrate; a mechanical resonance detecting operation of detecting vibration resonances of the plurality of electronic components; and a defective product determining operation of comparing the detected vibration resonances of the plurality of electronic components with a reference vibration resonance of a normal product through a post-processing processor to determine whether the plurality of electronic components have one or more defective electronic components and then extracting determined information.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Device for Detecting Mechanical Resonance Defect of Electronic Component

Hereinafter, a device for detecting a defective electronic component according to an exemplary embodiment in the present disclosure will be described with reference to FIGS. 1 through 8.

The device for detecting whether a plurality of electronic components having defective electronic components may include: an energy source generating energy and transferring the generated energy to the plurality of electronic components 12 in a non-contact manner to cause the plurality of electronic components to vibrate; a mechanical resonance detection unit 13 (e.g., a mechanical resonance detection device or a mechanical resonance detector) detecting vibration resonances of the plurality of electronic components; and a post-processing unit 14, which may include a computer including a processor, comparing the detected vibration resonances of the plurality of electronic components with a reference vibration resonance of a normal product to determine whether the plurality of electronic components have one or more defective electronic components and then extracting determined information.

The plurality of electronic components 12 may be a set of electronic components including at least one of ceramic insulators such as multilayer ceramic capacitors (MLCCs) and conductors such as metal.

Figure 3:
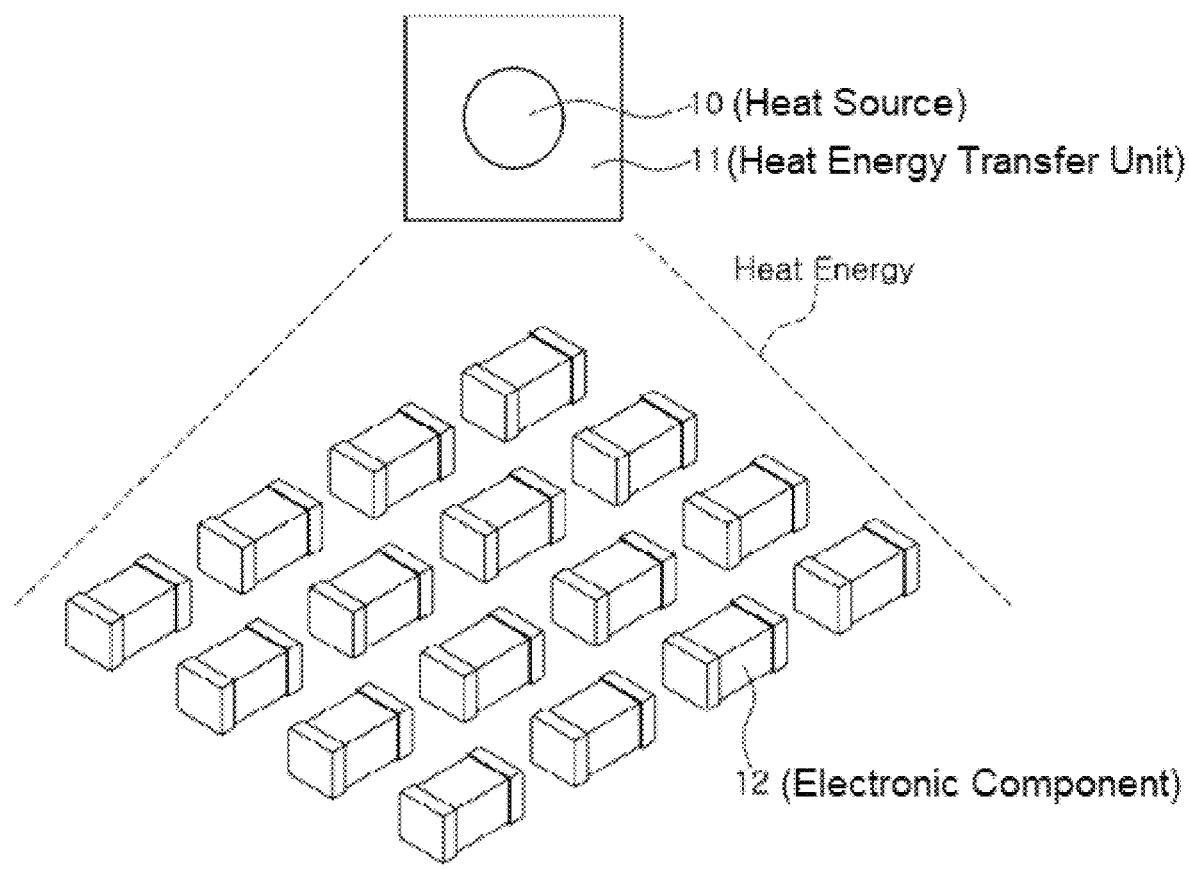
FIG. 3 is a schematic view illustrating a form in which heat energy due to a photothermal effect is transferred to a plurality of electronic components.
Figure 8:
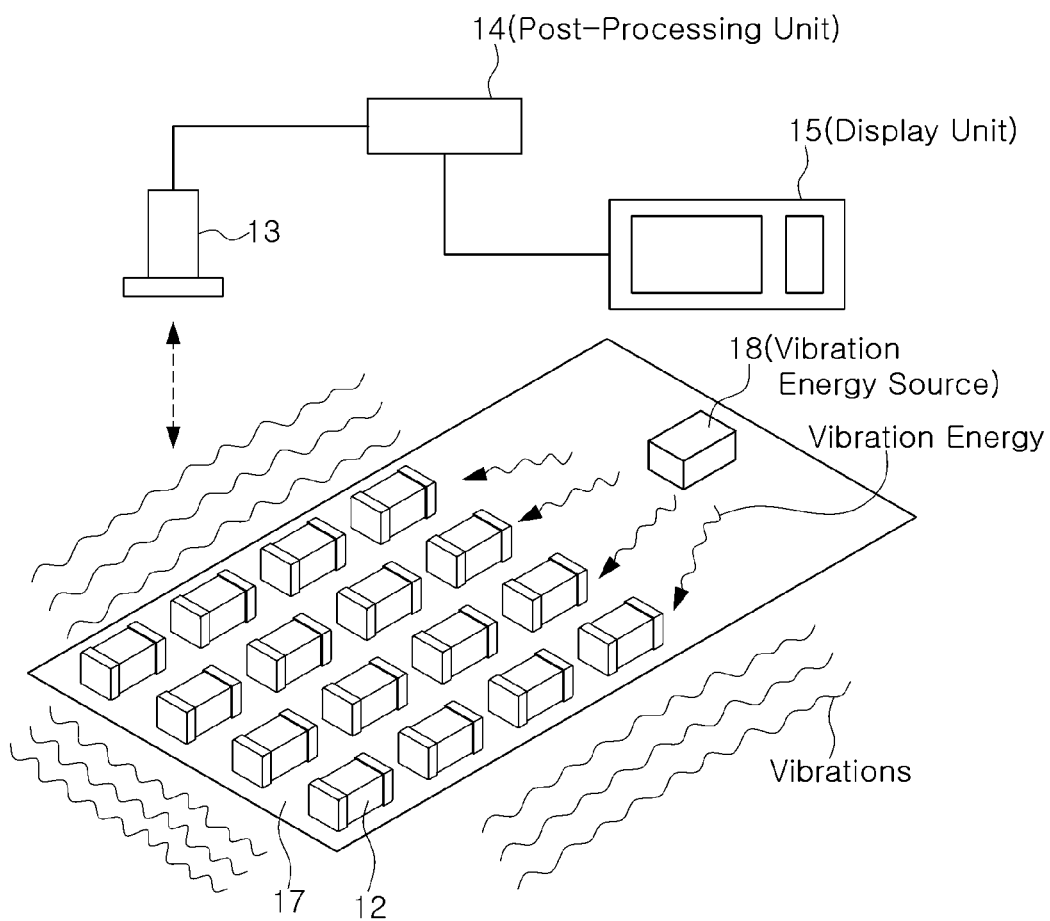
FIG. 8 is a schematic view illustrating a form of detecting a plurality of electronic components by transferring vibration energy to the plurality of electronic components.

Referring to FIGS. 3 and 8, the energy source may be a heat source 10 generating heat energy H due to a photothermal effect or may be a vibration energy source 18 generating vibration energy V, but is not limited thereto, and may be any energy source that may emit energy in a form capable of applying energy having a wide frequency range to at least one surface of the electronic component 100 (which is as one of a plurality of electronic components 12).

Accordingly, in the present specification, the energy source may refer to any one of the heat source 10 and the vibration energy source 18, and the energy may refer to any one of the heat energy H due to the photothermal effect and the vibration energy V, but the present disclosure is not limited thereto.

The energy source may simultaneously or intermittently transfer the energy to the plurality of electronic components, and a wavelength of the transferred energy is not particularly limited.

In this case, the energy source may transfer the generated energy to the plurality of electronic components 12 in the non-contact manner.

Here, the non-contact manner may refer to a manner in which the energy source is not in direct contact with the plurality of electronic components 12. For example, the energy source may be disposed to be spaced apart from the plurality of electronic components 12 with an atmospheric space or a vacuum space interposed therebetween.

The energy may be transferred to the plurality of electronic components 12 by various methods depending on types of the energy.

As an example, the heat energy H due to the photothermal effect may be transferred in the atmosphere, but is not limited thereto.

As another example, the vibration energy V may be transferred through a vibration energy transfer unit 17 (or a vibration energy transfer device) including a separate material having elasticity, but is not limited thereto.

In the related art, the energy source is in direct contact with the electronic component 100 to apply a voltage to the electronic component 100, and thus, energy is concentrated in a portion where the electronic component 100 and the energy source are in contact with each, such that damage to the electronic component 100 is caused and it is difficult to simultaneously detect defects of the plurality of electronic components 12.

In the related art, an electrode is disposed in a predetermined position on a material having an electrostrictive effect to detect an internal crack of the electronic component, and thus, there may be a problem in which an electronic component in which a crack occurs in a portion that does not have the electrostrictive effect may not be detected.

The device for detecting a defective electronic component according to an exemplary embodiment in the present disclosure may include the energy source capable of transferring the generated energy to the plurality of electronic components 12 in the non-contact manner to simultaneously generate the mechanical resonance in the plurality of electronic components 12.

Accordingly, the device for detecting a defective electronic component according to an exemplary embodiment may simultaneously detect internal defects of the plurality of electronic components 12 by simultaneously or sequentially transferring the energy to the plurality of electronic components 12.

In addition, the energy may be dispersed and transferred to a plurality of surfaces of the plurality of electronic components 12, such that concentration of the energy on a specific portion of one surface of the electronic component 100 may be prevented to prevent damage to the electronic component 100.

In addition, a crack or delamination that has occurred in a portion of an electronic component that does not have the electrostrictive effect may be detected, so that an electronic component, which is a defective product, may be detected regardless of a position where the crack or the delamination occurs.

In an exemplary embodiment, the energy source may transfer the generated energy to the plurality of surfaces of the plurality of electronic components 12.

Therefore, the energy transferred from the energy source may be prevented from being concentrated on a local portion of one surface of the electronic component, and the energy may be transferred to the plurality of surfaces of the plurality of electronic components 12, and thus, deterioration of electrical characteristics of the plurality of electronic components 12 may be prevented.

The plurality of electronic components 12 may receive the energy from the energy source to generate the mechanical resonance. The mechanical resonance may be generated in the plurality of electronic components 12 and may be emitted in the form of vibrations R to the outside of the plurality of electronic components 12, and the mechanical resonance detection unit 13 may detect the vibrations R due to the mechanical resonance generated in the plurality of electronic components 12.

A type or a configuration of the mechanical resonance detection unit 13 is not particularly limited as long as the mechanical resonance detection unit 13 may detect the vibrations due to the mechanical resonance generated in the plurality of electronic components 12, and the mechanical resonance detection unit 13 may detect the vibrations R without being in direct contact the plurality of electronic components 12 in terms of ease and quickness of a defect inspection and determination.

The mechanical resonance detection unit 13 may be a high-frequency or low-frequency high-sensitivity vibrometer, but is not limited thereto.

The vibrations R due to the mechanical resonance detected by the mechanical resonance detection unit 13 may be converted into and analyzed as data through the post-processing unit 14. The post-processing unit 14 may convert vibrations R due to mechanical resonance of a normal product input to a database in advance and the vibrations R due to the mechanical resonance detected by the mechanical resonance detection unit 13 into data and compare these vibrations R with each other to determine a defect.

The post-processing unit 14 may compare the vibrations R due to the mechanical resonance of the electronic component detected by the mechanical resonance detection unit 13 with vibrations R due to mechanical resonance of a normal product or a defective product to determine the defective product.

In this case, the post-processing unit 14 may intuitively compare information on the normal product and information on the defective product with each other to quickly determine the defective product.

The post-processing unit 14 may include a computer including a processor, a computer program, and/or a database, and mechanical resonance information of the normal product may be previously input to the database. When the processor executes the computer program stored in a non-transitory computer readable medium which the processor is coupled with, the processor may be configured to perform operations described with reference to the post-processing unit 14.

Figure 4:
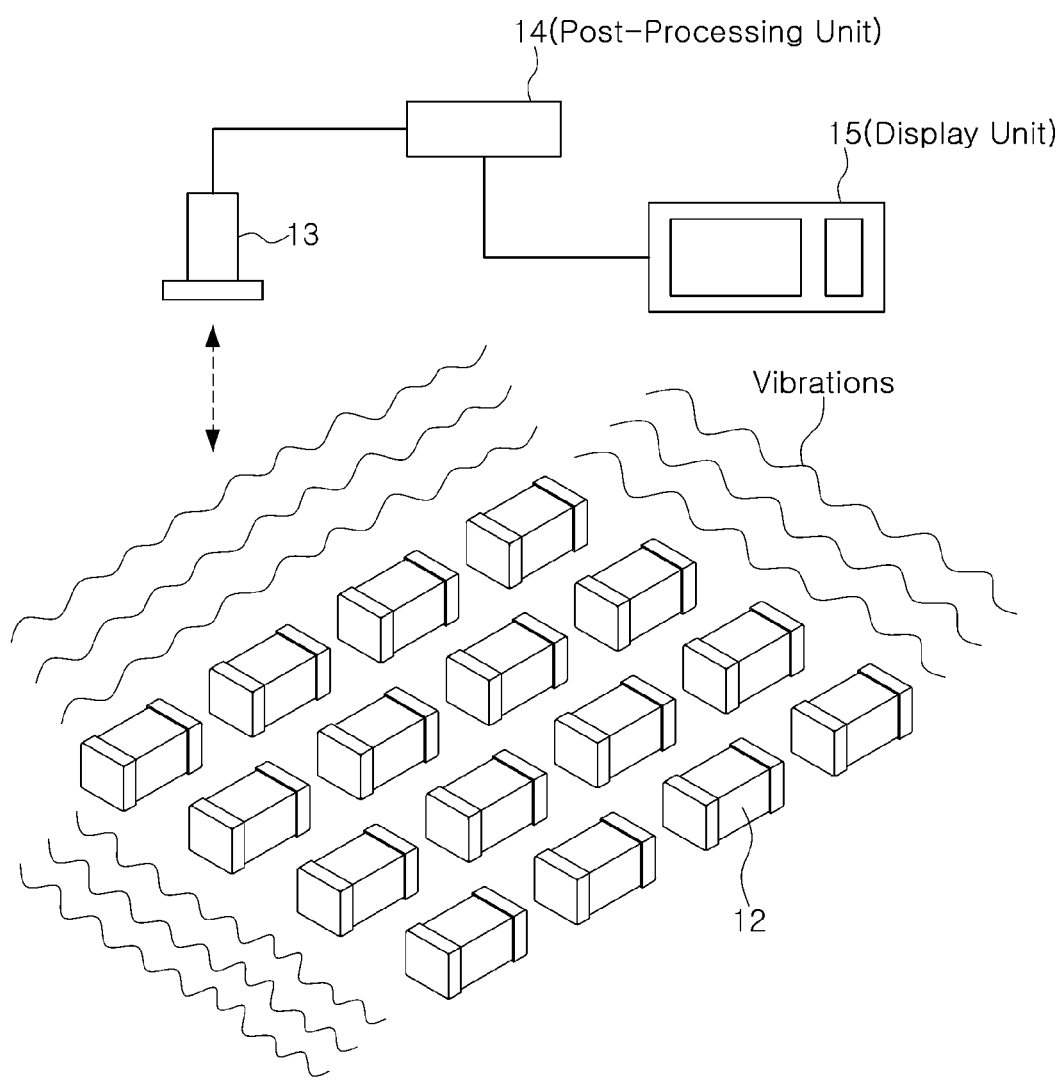
FIG. 4 is a schematic view illustrating a form of measuring the mechanical resonance of a plurality of electronic components.

Referring to FIGS. 4 and 8, the post-processing unit 14 may serve to recognize the presence or absence of defects in the plurality of electronic components 12, types of the defects, and positions of the electronic components having the defects, and display a recognition result on a display unit 15.

Accordingly, the defective product and the normal product may be determined through an intuitive comparison between the data on the vibrations due to the mechanical resonance, such that a large amount of defective products may be quickly and accurately detected.

In addition, the number of defective products, positions of the defective products, and types of the defects may be detected through an intuitive comparison between frequencies and magnitudes of the mechanical resonance, such that defective products having various defects may be quickly and specifically determined.

Here, the vibrations due to the mechanical resonance detected by the mechanical resonance detection unit 13 may be converted into and analyzed as data through a processor (such as the processor of the post-processing unit 14) when the processor executes a computer program stored in a non-transitory computer readable medium which the processor is coupled with, and a process of comparing the vibrations due to the mechanical resonance of the defective product and the vibrations due to the mechanical resonance of the normal product with each other to determine types of the defects and a large amount of defective products may be performed through the processor when executing a computer program.

Meanwhile, respective components of the device for detecting a defective electronic component according to an exemplary embodiment in the present disclosure may configure one module so as to be connected to each other through an electrical circuit to transmit and receive electrical signals.

In an exemplary embodiment, the mechanical resonance detection unit 13 of the device for detecting a defective electronic component according to an exemplary embodiment in the present disclosure may serve to detect displacements, velocities, or accelerations of magnitudes with respect to frequencies of the mechanical resonance generated in the plurality of electronic components.

Accordingly, the mechanical resonance detection unit 13 may detect various types of the frequencies and the magnitudes of the mechanical resonance, and thus, obtain more information on internal defects of the plurality of electronic components 12 to allow the post-processing unit 14 to quickly and accurately detect the defective products.

When the vibrations R due to the mechanical resonance are expressed as a displacement, a velocity, or an acceleration of a magnitude with respect to a frequency, a difference in waveform such as a magnitude at a specific frequency may occur between the defective product having the defect and the normal product.

Forms of the vibrations R due to the mechanical resonance of the normal product and the defective product may have a difference in a frequency at which a peak appears, and may also have differences in a frequency at which a maximum peak is formed and a magnitude of the maximum peak.

Such differences may occur due to types, generation positions, the number, and the like, of defects, and forms of unique vibrations depending on the types, the generation positions, and the number of defects may be stored in the database in advance.

Figure 5A:
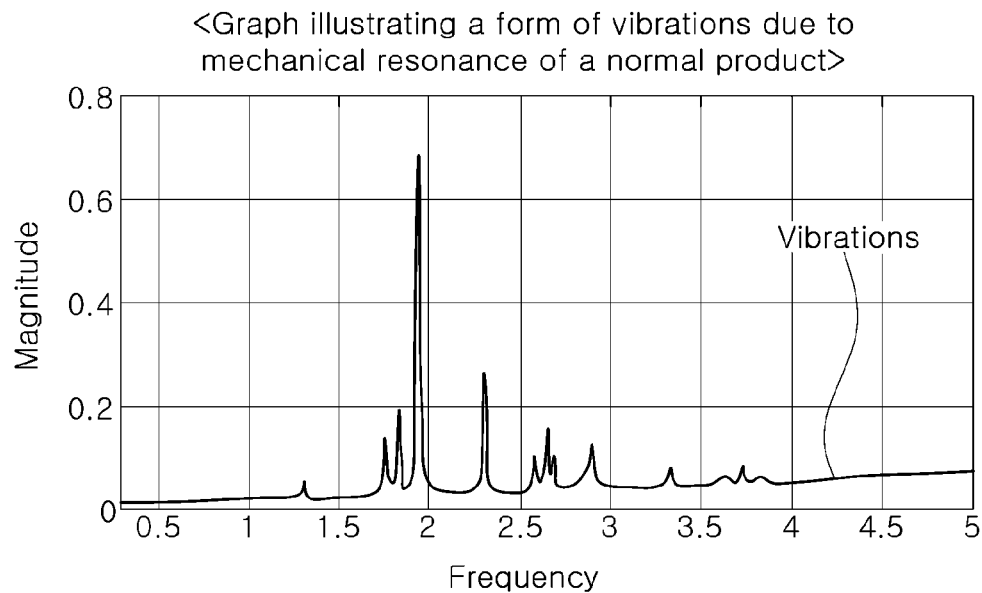
FIG. 5A is a graph illustrating a form of vibrations due to mechanical resonance of a normal product.
Figure 5B:
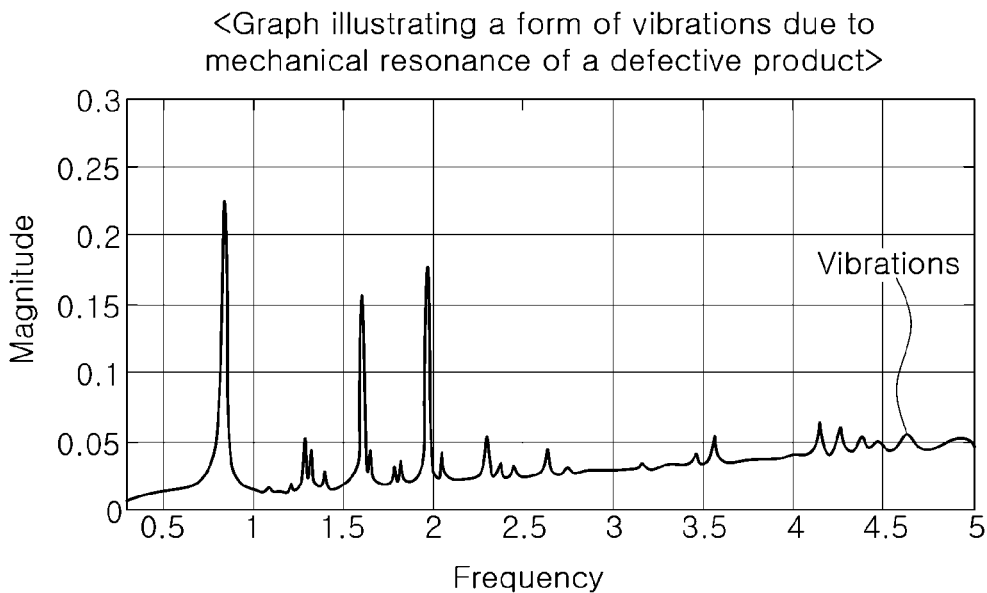
FIG. 5B is a graph illustrating a form of vibrations due to mechanical resonance of a defective product.

FIG. 5A is a graph illustrating a form of vibrations R due to mechanical resonance of a normal product, and FIG. 5B is a graph illustrating a form of vibrations R due to mechanical resonance of a defective product.

Forms of the vibrations R due to the mechanical resonance detected by the mechanical resonance detection unit 13 may be unique forms depending on types of defects, positions of the defects, and the number of defects, and may have differences large enough to be intuitively recognizable.

For example, it can be seen that a frequency at which a maximum magnitude is formed is about 1.9 MHz in FIG. 5A, which is the graph illustrating the form of the vibrations R due to the mechanical resonance of the normal product, while a frequency at which a maximum magnitude is formed is about 0.8 MHz in FIG. 5B, which is the graph illustrating the form of the vibrations R due to the mechanical resonance of the defective product. In addition, there may be a difference large enough to be intuitively recognized even between the maximum magnitudes.

Figure 6:
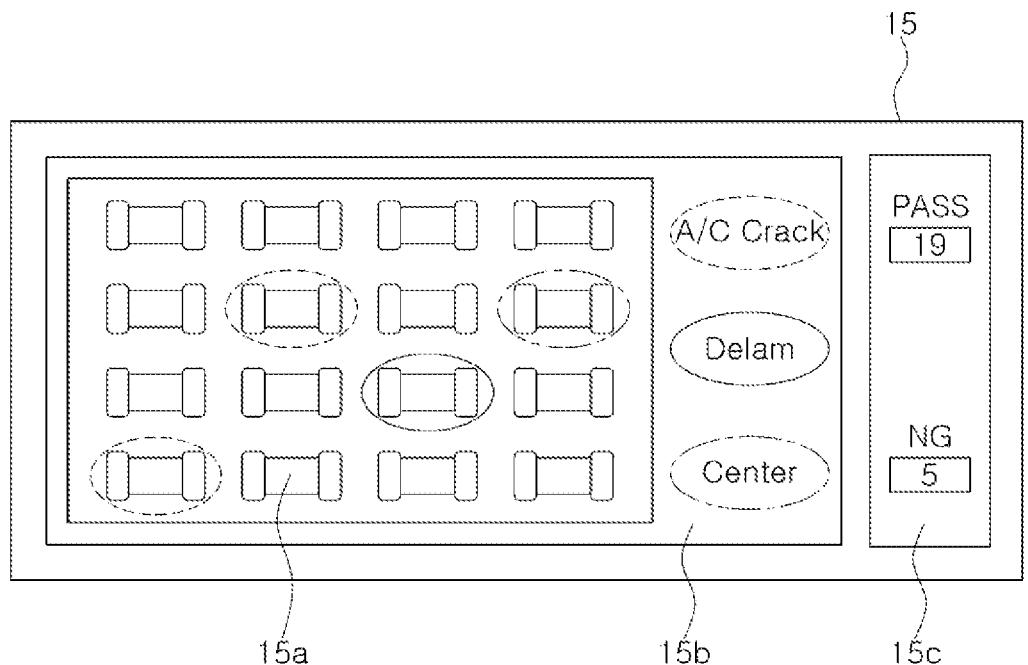
FIG. 6 is a schematic view illustrating components of a display unit.

Referring to FIG. 6, the display unit 15 may display the plurality of electronic components 12, and may include a defective product display unit 15a capable of visually confirming positions of the defective products, a defect display unit 15b capable of displaying types of defects, and a normal product display unit 15c capable of displaying the numbers of normal products and defective products.

Accordingly, even in a case of the plurality of electronic components 12, the types of the defects may be easily grasped, and the number of normal products and defective products may be quickly grasped.

In an exemplary embodiment, when the energy source is the heat source 10 by the photothermal effect, the heat energy H may be transferred to the plurality of electronic components 12 in the atmosphere.

In order to transfer the heat energy H due to the photothermal effect to the plurality of electronic components 12, the heat source 10 may be disposed to be spaced apart from the plurality of electronic components 12 with an atmospheric space or a vacuum space interposed therebetween.

Accordingly, the heat energy due to the photothermal effect may be transferred to the electronic components in the atmosphere, and thus, shapes of the electronic components may not be affected, and a time required to find a specific position may be saved, and thus, an inspection speed may be improved.

In addition, a defect determination inspection may be simultaneously performed in a wide frequency area on an arrangement of the plurality of electronic components 12, which may be effective in detecting a large amount of defective products.

In addition, the heat energy H due to the photothermal effect may be transferred to the plurality of electronic components 12 in the atmosphere without passing through a separate liquid or solid medium or in a state in which a medium does not exist, and the defects may thus be quickly and accurately detected without forming a conducting part or creating a special environment.

In this case, the device for detecting a defective electronic component according to an exemplary embodiment in the present disclosure may further include a heat energy transfer unit 11 capable of adjusting a direction of the heat energy H due to the photothermal effect generated from the heat source 10 so that the heat energy H may be transferred to the plurality of surfaces of the electronic components 100 or adjusting a direction or a strength of the heat energy H so as to generate the mechanical resonance by generating a thermoelastic effect.

Here, the heat energy transfer unit 11 may also serve to transfer energy to the plurality of electronic components 12 in the atmosphere.

Figure 1:
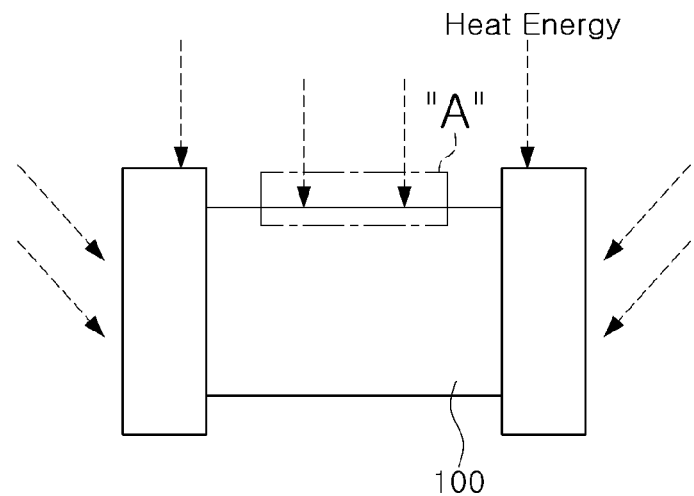
FIG. 1 is a schematic view illustrating a form in which heat energy due to a photothermal effect is transferred to an electronic component.
Figure 2:
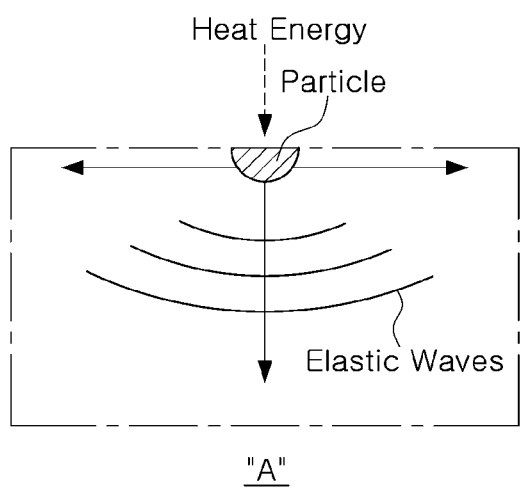
FIG. 2 is a schematic enlarged view illustrating a form in which a thermoelastic effect occurs in area A of FIG. 1.

Referring to FIGS. 1 and 2, the electronic component 100 receiving the heat energy H due to the photothermal effect from the energy source may generate the mechanical resonance due to the thermoelastic effect.

When the heat energy H due to the photothermal effect is transferred to the electronic component 100, a temperature may rise and fall on a surface of the electronic component 100. In this case, expansion and contraction P of particles may occur inside the electronic component due to the thermoelastic effect.

The expansion and contraction P of the particles may generate elastic waves U, and the electronic component itself may vibrate by the elastic waves U. The electronic component may generate the mechanical resonance by excitation of the elastic waves, and the vibrations R due to such mechanical resonance may be emitted in all directions of the electronic component 100.

The vibrations R due to such mechanical resonance may also occur when the heat energy H is transferred to the plurality of electronic components 12, and the phenomenon as described above may occur in each electronic component 100 constituting the plurality of electronic components 12.

According to an exemplary embodiment of FIG. 8, the energy source may be the vibration energy source 18 generating the vibration energy V. Accordingly, the energy source may be a vibrator or a transducer, but is not limited thereto, and may be any member that may generate the vibration energy V.

When the energy source generates the vibration energy V, the vibration energy V may be indirectly transferred to the plurality of electronic components 12 through the vibration energy transfer unit 17.

In an exemplary embodiment, the energy source of the device for detecting a defective electronic component may be the vibration energy source 18 generating the vibration energy V, and may indirectly transfer the vibration energy V to the plurality of electronic components 12 through the vibration energy transfer unit.

In this case, the plurality of electronic components 12 may generate the vibrations R due to the mechanical resonance in response to the transferred vibration energy V.

In this case, the vibration energy transfer unit 17 may be a vibration energy transfer unit 17 formed of a vibration transfer member in contact with all of one surfaces of respective electronic components 100 constituting the plurality of electronic components 12.

Therefore, the vibration energy V may be simultaneously or sequentially transferred to the plurality of electronic components without a plurality of vibration energy sources 18.

The vibration energy transfer unit 17 may be any member that may simultaneously or sequentially transfer the vibration energy to the plurality of electronic components by including a material having elasticity. In one example, the vibration energy transfer unit 17 may include an elastic plate. Since the vibration energy is propagated through a medium, the vibration energy transfer unit 17 may be in contact with one surfaces of the plurality of electronic components 12 and the vibration energy source 18 at the same time.

The display unit 15 may include a display panel, and may serve to visually or auditorily display information received from the post-processing unit 14.

The display unit 15 may be connected to the post-processing unit 14 through an electrical circuit, and may serve to receive an electrical signal from the post-processing unit 15 and convert the electrical signal into an audio or visual signal.

The information displayed on the display unit 15 may be types of defects, positions of the electronic components having the defects, the presence or absence of the defects, the number of normal products, the number of defective products, and the like, and each information may be expressed by different colors so as to be intuitively recognized, but is not limited thereto, and may be expressed by distinguishable marks.

In an exemplary embodiment, the device for detecting a defect of an electronic component according to an exemplary embodiment in the present disclosure may further include an extraction unit 16 extracting defective products determined by the post-processing unit 14.

Figure 7:
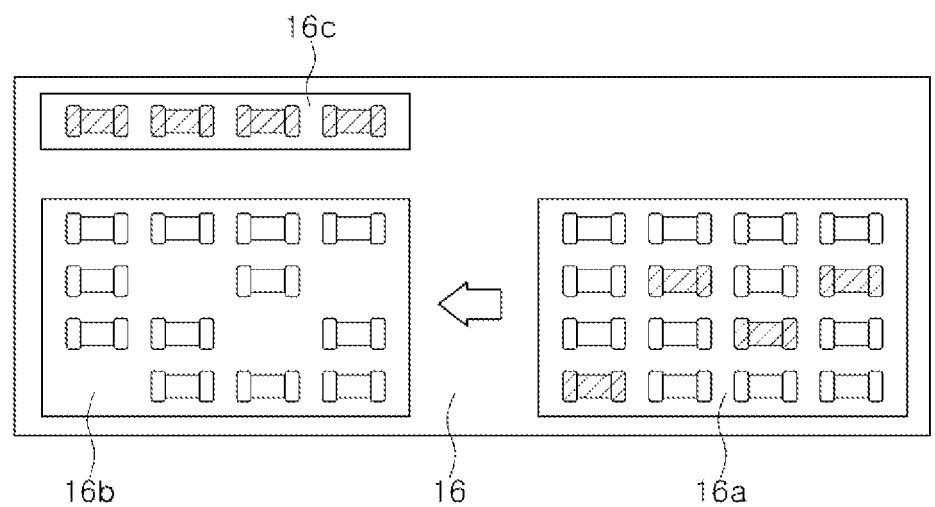
FIG. 7 is a schematic view illustrating components of an extraction unit.

Referring to FIG. 7, the extraction unit 16 may serve to extract, in response to the detection results from the post-processing unit 14, an arrangement 16c of electronic components including only defective products from a plurality of electronic components 16a in which normal products and the defective products are mixed with each other, from an existing arrangement. As a result, the plurality of electronic components may have an arrangement 16b of electronic components including only normal products.

Accordingly, an additional process may be easy by extracting only the arrangement 16c of the electronic components including only the defective products while maintaining the existing arrangement of the electronic components in a process of inspecting the defective products. As such, the products are separated into two groups, one contacting defective products and the other containing normal products, spaced apart from each other.

Method of Detecting Mechanical Resonance Defect of Electronic Component

Hereinafter, a method of detecting a mechanical resonance defect of an electronic component according to the present disclosure will be described in detail. A description of components overlapping those of the device for detecting a mechanical resonance defect of an electronic component according to the present disclosure will be omitted.

A method of detecting whether a plurality of electronic components having defective electronic components may include: an energy transfer operation of transferring energy generated by an energy source to the plurality of electronic components in a non-contact manner to cause the plurality of electronic components to vibrate; a mechanical resonance detecting operation of detecting vibration resonances of the plurality of electronic components; and a defective product determining operation of comparing the detected vibration resonances of the plurality of electronic components with a reference vibration resonance of a normal product through a post-processing processor to determine whether the plurality of electronic components have one or more defective electronic components and then extracting determined information.

Referring to FIGS. 3 and 8, the energy transfer operation may be an operation of transferring the heat energy H generated by the heat source 10 generating the heat energy H due to the photothermal effect or may be an operation of transferring the vibration energy generated by the vibration energy source 18 generating the vibration energy V, but is not limited thereto, and may be an operation of transferring energy in a form capable of applying energy having a wide frequency range to at least one surface of the plurality of electronic components 12.

The energy source may simultaneously or intermittently transfer the energy to the plurality of electronic components, and a wavelength of the transferred energy is not particularly limited.

In this case, the energy source may transfer the generated energy to the plurality of electronic components 12 in the non-contact manner.

Here, the non-contact manner may refer to a manner in which the energy source is not in direct contact with the plurality of electronic components 12. To this end, the energy source and the plurality of electronic components 12 may be disposed to be spaced apart from each other.

The energy may be transferred to the plurality of electronic components 12 by various methods depending on types of the energy.

As an example, the heat energy H due to the photothermal effect may be transferred in the atmosphere, but is not limited thereto.

As another example, the vibration energy V may be transferred through a vibration energy transfer unit 17 including a separate material having elasticity, but is not limited thereto.

In the related art, the energy source is in direct contact with the electronic component 100 to apply a voltage to the electronic component 100, and thus, energy is concentrated in a portion where the electronic component 100 and the energy source are in contact with each, such that damage to the electronic component 100 is caused and it is difficult to simultaneously detect defects of the plurality of electronic components 12.

In the related art, an electrode is disposed in a predetermined position on a material having an electrostrictive effect to detect an internal crack of the electronic component, and thus, there may be a problem in which an electronic component in which a crack occurs in a portion that does not have the electrostrictive effect may not be detected.

The method of detecting a defective electronic component according to an exemplary embodiment in the present disclosure may include the energy transfer operation of transferring the generated energy to the plurality of electronic components 12 in the non-contact manner to simultaneously generate the mechanical resonance in the plurality of electronic components 12.

Accordingly, the device for detecting a defective electronic component according to an exemplary embodiment may simultaneously detect internal defects of the plurality of electronic components 12 by simultaneously or sequentially transferring the energy to the plurality of electronic components 12.

In addition, the energy may be dispersed and transferred to a plurality of surfaces of the plurality of electronic components 12, such that concentration of the energy on a specific portion of one surface of the electronic component 100 may be prevented to prevent damage to the electronic component 100.

In addition, a crack or delamination that has occurred in a portion of an electronic component that does not have the electrostrictive effect may be detected, so that an electronic component, which is a defective product, may be detected regardless of a position where the crack or the delamination occurs.

In an exemplary embodiment, the energy transfer operation may be an operation of transferring the generated energy to the plurality of surfaces of the plurality of electronic components 12.

Therefore, the energy transferred from the energy source may be prevented from being concentrated on a local portion of one surface of the electronic component, and the energy may be transferred to the plurality of surfaces of the plurality of electronic components 12, and thus, deterioration of electrical characteristics of the plurality of electronic components 12 may be prevented.

The plurality of electronic components 12 may receive the energy from the energy source to generate the mechanical resonance. The mechanical resonance may be generated in the plurality of electronic components 12 and may be emitted in the form of vibrations to the outside of the plurality of electronic components 12, and in the mechanical resonance detecting operation, the vibrations R due to the mechanical resonance generated in the plurality of electronic components 12 may be detected.

A type or a configuration of the mechanical resonance detection unit 13 used in the mechanical resonance detecting operation is not particularly limited as long as the mechanical resonance detection unit 13 may detect the vibrations due to the mechanical resonance generated in the plurality of electronic components 12, and the mechanical resonance detection unit 13 may detect the vibrations due to the mechanical resonance in the non-contact manner in terms of easiness and quickness of a defect inspection and determination.

The mechanical resonance detecting operation may be an operation of detecting displacements, velocities, or accelerations of magnitudes with respect to frequencies of the mechanical resonance generated in the plurality of electronic components. Accordingly, the mechanical resonance detection unit 13 may detect various types of the frequencies and the magnitudes of the mechanical resonance, and thus, obtain more information on internal defects of the plurality of electronic components 12 to allow the post-processing unit 14 to quickly and accurately detect the defective products.

When the vibrations due to the mechanical resonance are expressed as a displacement, a velocity, or an acceleration of a magnitude with respect to a frequency, a difference in waveform such as a magnitude at a specific frequency may occur between the defective product having the defect and the normal product.

Forms of the vibrations due to the mechanical resonance of the normal product and the defective product may have a difference in a frequency at which a peak appears, and may also have differences in a frequency at which a maximum peak is formed and a magnitude of the maximum peak.

Such differences may occur due to types, generation positions, the number, and the like, of defects, and forms of unique vibrations depending on the types, the generation positions, and the number of defects may be stored in the database in advance.

FIG. 5A is a graph illustrating a form of vibrations due to mechanical resonance of a normal product, and FIG. 5B is a graph illustrating a form of vibrations due to mechanical resonance of a defective product.

Forms of the vibrations due to the mechanical resonance detected by the mechanical resonance detection unit 13 may be unique forms depending on types of defects, positions of the defects, and the number of defects, and may have differences large enough to be intuitively recognizable.

For example, it can be seen that a frequency at which a maximum magnitude is formed is about 1.9 MHz in FIG. 5A, which is the graph illustrating the form of the vibrations due to the mechanical resonance of the normal product, while a frequency at which a maximum magnitude is formed is about 0.8 MHz in FIG. 5B, which is the graph illustrating the form of the vibrations due to the mechanical resonance of the defective product. In addition, there may be a difference large enough to be intuitively recognized even between the maximum magnitudes.

In the defective product determining operation, the vibrations due to the mechanical resonance detected by the mechanical resonance detection unit 13 may be converted into and analyzed as data by the post-processing unit 14. In the defective product determining operation, vibrations R due to mechanical resonance of a normal product input to a database in advance and the vibrations R due to the mechanical resonance detected by the mechanical resonance detection unit 13 may be converted into data and compared with each other to determine a defect.

The post-processing unit 14 may compare the vibrations R due to the mechanical resonance of the electronic component detected by the mechanical resonance detection unit 13 with vibrations R due to mechanical resonance of a normal product or a defective product to determine the defective product.

In this case, the post-processing unit 14 may intuitively compare information on the normal product and information on the defective product with each other to quickly determine the defective product.

The post-processing unit 14 may include a computer program or a database, and vibration information due to the mechanical resonance of the normal product may be previously input to the database.

Referring to FIGS. 4 and 8, the post-processing unit 14 may serve to recognize the presence or absence of defects in the plurality of electronic components 12, types of the defects, and positions of the electronic components having the defects, and display a recognition result on a display unit 15.

Accordingly, the defective product and the normal product may be determined through an intuitive comparison between the data on the vibrations R due to the mechanical resonance, such that a large amount of defective products may be quickly and accurately detected.

In addition, the number of defective products, positions of the defective products, and types of the defects may be detected through an intuitive comparison between forms of the vibrations V due to the mechanical resonance, such that defective products having various defects may be quickly and specifically determined.

Here, the vibrations R due to the mechanical resonance detected by the mechanical resonance detection unit 13 may be converted into and analyzed as data through a computer program, and a process of comparing the vibrations due to the mechanical resonance of the defective product and the vibrations due to the mechanical resonance of the normal product with each other to determine types of the defects and a large amount of defective products may be performed through a computer program.

In an exemplary embodiment, the energy transfer operation may be an operation of transferring the heat energy due to the photothermal effect generated by the heat source to the plurality of electronic components in the atmosphere to generate the mechanical resonance in the plurality of electronic components.

Here, a method of transferring the heat energy due to the photothermal effect may be a method of transferring the heat energy due to the photothermal effect in the atmosphere or vacuum without passing the heat energy through a liquid or solid medium.

Accordingly, the heat energy may be directly transferred to the electronic components in the non-contact manner, and thus, shapes of the electronic components may not be affected, and a time required to find a specific position may be saved, and thus, an inspection speed may be improved.

In addition, a defect determination inspection may be simultaneously performed in a wide frequency area on an arrangement of the plurality of electronic components 12, which may be effective in detecting a large amount of defective products.

In addition, the heat energy H may be transferred to the plurality of electronic components 12 in the atmosphere without passing through a separate liquid or solid medium or in a state in which a medium does not exist, and the defects may thus be quickly and accurately detected without forming a conducting part or creating a special environment.

In this case, the device for detecting a defect of an electronic component according to an exemplary embodiment in the present disclosure may further include a heat energy transfer unit 11 capable of adjusting a direction of the heat energy H due to the photothermal effect generated from the heat source 10 so that the heat energy H may be transferred to the plurality of surfaces of the electronic components 100 or adjusting a direction or a strength of the heat energy H so as to generate the mechanical resonance by generating a thermoelastic effect.

Referring to FIGS. 1 and 2, the electronic component 100 receiving the heat energy H due to the photothermal effect from the energy source may generate the mechanical resonance due to the thermoelastic effect.

When the heat energy H due to the photothermal effect is transferred to the electronic component 100, a temperature may rise and fall on a surface of the electronic component 100. In this case, expansion and contraction P of particles may occur inside the electronic component due to the thermoelastic effect.

The expansion and contraction P of the particles may generate elastic waves U, and the electronic component itself may vibrate by the elastic waves U. When a natural frequency of the electronic component and a frequency of the elastic waves coincide with each other, the electronic component may generate the mechanical resonance, and the vibrations R due to such mechanical resonance may be emitted in all directions of the electronic component 100.

The vibrations due to such mechanical resonance may also occur when the heat energy H is transferred to the plurality of electronic components 12, and the phenomenon as described above may occur in each electronic component 100 constituting the plurality of electronic components 12.

In an exemplary embodiment, the energy transfer operation may be an operation of indirectly transferring the vibration energy generated by the vibration energy source to the plurality of electronic components through the vibration energy transfer unit 18 to generate the mechanical resonance in the plurality of electronic components.

When the energy source generates the vibration energy V, the vibration energy V may be indirectly transferred to the plurality of electronic components 12 through the vibration energy transfer unit 18.

In this case, the plurality of electronic components 12 may generate the vibrations R due to the mechanical resonance in response to the transferred vibration energy V.

In this case, the energy transfer operation may be an operation of transferring the vibration energy through the vibration energy transfer unit 17 formed of the vibration transfer member in contact with all of one surfaces of the respective electronic components 100 constituting the plurality of electronic components 12. Therefore, the vibration energy V may be simultaneously or sequentially transferred to the plurality of electronic components without a plurality of vibration energy sources 18.

The vibration energy transfer unit 17 may be any member that may simultaneously or sequentially transfer the vibration energy to the plurality of electronic components by including a material having elasticity. Since the vibration energy is propagated through a medium, the vibration energy transfer unit 17 may be in contact with one surfaces of the plurality of electronic components 12 and the vibration energy source 18 at the same time.

In an exemplary embodiment, the defective product determining operation may be an operation of extracting defective product information, which is at least one of the number of defective products, positions of the defective products, and types of the defects.

Therefore, an outflow of defective products may be prevented in advance by quickly grasping specific information on the defective products in an arrangement of the plurality of electronic components 12.

The information on the defective products determined as described above may be visually or auditorily displayed through the display unit 15 or may be transferred to extraction unit and be used in an operation of extracting the determined defective products.

The method of detecting a defect of an electronic component according to an exemplary embodiment may further include, after the defective product determining operation, a defective product extracting operation of extracting the defective products determined by the post-processing unit.

Referring to FIG. 7, the extraction unit 16 may serve to extract an arrangement 16c of electronic components including only defective products from a plurality of electronic components 16a in which normal products and the defective products are mixed with each other, from an existing arrangement. As a result, the plurality of electronic components may have an arrangement 16b of electronic components including only normal products.

Accordingly, an additional process may be easy by extracting only the arrangement 16c of the electronic components including only the defective products while maintaining the existing arrangement of the electronic components in a process of inspecting the defective products.

The method of detecting a defect of an electronic component according to an exemplary embodiment may further include, after the defective product determining operation, a defective product displaying operation of displaying the defective product information determined by the post-processing unit.

The display unit 15 may include a display panel, and may serve to visually or auditorily display information received from the post-processing unit 14.

The display unit 15 (which may include a speaker) may be connected to the post-processing unit 14 through an electrical circuit, and may serve to receive an electrical signal from the post-processing unit 15 and convert the electrical signal into an auditory or visual signal.

The information displayed on the display unit 15 may be types of defects, positions of the electronic components having the defects, the presence or absence of the defects, the number of normal products, the number of defective products, and the like, and each information may be expressed by different colors so as to be intuitively recognized, but is not limited thereto, and may be expressed by distinguishable marks.

Referring to FIG. 6, the display unit 15 may display the plurality of electronic components 12, and may include a defective product display unit 15a capable of visually confirming positions of the defective products, a defect display unit 15b capable of displaying types of defects, and a normal product display unit 15c capable of displaying the numbers of normal products and defective products.

Accordingly, even in a case of the plurality of electronic components 12, the types of the defects may be easily grasped, and the number of normal products and defective products may be quickly grasped.

As set forth above, according to an exemplary embodiment in the present disclosure, a device and method for detecting a defect of an electronic component that are economical and quick, and have high accuracy may be provided.

In addition, a device and method for detecting a defect of an electronic component capable of quickly and conveniently detecting the defect of the electronic component without using a separate conducting part may be provided.

Further, a device and method for detecting a defect of an electronic component capable of detecting various defects regardless of a position of the electronic component may be provided.

Further, a device and method for detecting a defect of an electronic component capable of accurately detecting a defective product even when a size of a defect is small or defects are formed at various positions may be provided.

Further, a device and method for detecting a defect of an electronic component capable of quickly, conveniently, and accurately detecting defective products when electronic components are arranged in a plurality of arrangements may be provided.

While exemplary embodiments have been shown and described above, it will be apparent to those skilled in the art that modifications and variations could be made without departing from the scope of the present invention as defined by the appended claims.

What is claimed is:

1. A device for detecting whether a plurality of electronic components have one or more defective electronic components, comprising:
    a heat source generating heat energy due to a photothermal effect and transferring the generated thermal energy to the plurality of electronic components in a non-contact manner to cause the plurality of electronic components which are spaced apart from each other to vibrate simultaneously;
    a mechanical resonance detector detecting vibration resonances of the plurality of electronic components simultaneously; and
    a post-processing processor comparing the detected vibration resonances of the plurality of electronic components with a reference vibration resonance of a normal product to simultaneously determine whether the plurality of electronic components have one or more defective electronic components and then extracting determined information,
    wherein the heat energy is transmitted to the plurality of electronic components in the non-contact manner through air.

2. The device of claim 1, wherein the mechanical resonance detector detects displacements, velocities, or accelerations of magnitudes with respect to vibration frequencies of the plurality of electronic components.

3. The device of claim 1, wherein the determined information extracted by the post-processing processor include the number of defective products, positions of the defective products, and/or types of defects.

4. The device of claim 1, further comprising an extraction device extracting the one or more defective electronic components determined by the post-processing processor.

5. The device of claim 1, further comprising a display displaying the determined information.

6. A method of detecting whether a plurality of electronic components have one or more defective electronic components, the method comprising:
    an energy transfer operation of transferring heat energy due to a photothermal effect generated by a heat source to the plurality of electronic components in a non-contact manner to cause the plurality of electronic components which are spaced apart from each other to vibrate simultaneously;
    a mechanical resonance detecting operation of detecting vibration resonances of the plurality of electronic components simultaneously; and
    a defective product determining operation of comparing the detected vibration resonances of the plurality of electronic components with a reference vibration resonance of a normal product through a post-processing processor to simultaneously determine whether the plurality of electronic components have one or more defective electronic components and then extracting determined information,
    wherein the heat energy is transmitted to the plurality of electronic components in the non-contact manner through air.

7. The method of claim 6, wherein the mechanical resonance detecting operation includes an operation of detecting displacements, velocities, or accelerations of magnitudes with respect to vibration frequencies of the plurality of electronic components.

8. The method of claim 6, wherein the defective product determining operation includes an operation of extracting the determined information which is at least one of the number of defective products, positions of the defective products, and/or types of defects.

9. The method of claim 6, further comprising a defective product extracting operation of extracting the one or more defective electronic components determined by the post-processing processor.

10. The method of claim 6, further comprising a defective product displaying operation of displaying the determined information.

* * * * *